(12) United States Patent
Alakarhu et al.

(10) Patent No.: US 8,773,543 B2
(45) Date of Patent: Jul. 8, 2014

(54) METHOD AND APPARATUS FOR IMAGE DATA TRANSFER IN DIGITAL PHOTOGRAPHING

(75) Inventors: Juha Alakarhu, Helsinki (FI); Matti Hämäläinen, Lempäälä (FI); Ossi Kalevo, Toijala (FI); Tero Vuori, Vantaa (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 13/360,409

(22) Filed: Jan. 27, 2012

(65) Prior Publication Data
US 2013/0194454 A1     Aug. 1, 2013

(51) Int. Cl.
H04N 5/225    (2006.01)
H04N 5/262    (2006.01)
H04N 7/14     (2006.01)

(52) U.S. Cl.
USPC .......... 348/218.1; 348/207.1; 348/207.2; 348/240.2; 348/240.3; 348/240.99; 348/239; 348/14.01; 348/14.12

(58) Field of Classification Search
USPC .......... 348/211.14, 218.2, 207.99–207.2, 348/86–92, 872, 349, 240.2, 239, 14.01, 348/14.12, 218.1, 240.99, 240.3
See application file for complete search history.

(56) References Cited

U.S. PATENT DOCUMENTS

| 6,553,150 | B1 * | 4/2003 | Wee et al. ............. 382/243 |
| 6,670,991 | B1 * | 12/2003 | Takagi et al. ............. 348/349 |
| 6,914,632 | B1 | 7/2005 | Kim |
| 7,161,619 | B1 * | 1/2007 | Niida et al. ............. 348/207.11 |
| 2001/0050712 | A1 * | 12/2001 | Dunton et al. ............. 348/220 |
| 2003/0193593 | A1 | 10/2003 | Lee et al. |
| 2004/0022423 | A1 * | 2/2004 | Chen et al. ............. 382/118 |
| 2004/0223058 | A1 * | 11/2004 | Richter et al. ............. 348/207.1 |
| 2005/0046730 | A1 * | 3/2005 | Li ............. 348/333.12 |
| 2005/0053301 | A1 * | 3/2005 | Chui et al. ............. 382/239 |
| 2006/0274152 | A1 * | 12/2006 | Low et al. ............. 348/207.1 |
| 2008/0165280 | A1 | 7/2008 | Deever et al. |
| 2008/0291265 | A1 * | 11/2008 | Wagner et al. ............. 348/14.16 |
| 2008/0309810 | A1 | 12/2008 | Smith et al. |
| 2009/0040349 | A1 | 2/2009 | Xu |
| 2009/0185055 | A1 * | 7/2009 | Ono ............. 348/234 |
| 2009/0263021 | A1 * | 10/2009 | Takamori et al. ............. 382/181 |
| 2009/0274393 | A1 | 11/2009 | Patel et al. |
| 2010/0232504 | A1 | 9/2010 | Feng |
| 2010/0289904 | A1 | 11/2010 | Zhang et al. |
| 2010/0289913 | A1 | 11/2010 | Fujiwara |
| 2010/0290705 | A1 * | 11/2010 | Nakamura ............. 382/173 |
| 2010/0295932 | A1 * | 11/2010 | Yokomachi et al. ............. 348/79 |
| 2011/0254976 | A1 | 10/2011 | Garten |
| 2012/0236181 | A1 | 9/2012 | Noyes |

FOREIGN PATENT DOCUMENTS

WO     WO03053043     6/2003

OTHER PUBLICATIONS

"Cropped Senor Mode in Andor Cameras (CCDs and EMCCDs)", Web page: http://www.andor.com/learning/digital_cameras/?docid=794, downloaded Jan. 26, 2012, 3 pages.
International Search Report for International Application No. PCT/FI2013/050077—Date of Completion of Search; Jul. 2, 2013, 5 pages.

* cited by examiner

Primary Examiner — Nhan T Tran
Assistant Examiner — Xi Wang
(74) Attorney, Agent, or Firm — Locke Lord LLP

(57) ABSTRACT

An apparatus and method are described in which image information is received from an image sensor relating to one image frame, one or more sub-images are produced from the received image information according to given cropping data; and the produced one or more sub-images are forwarded through an output.

18 Claims, 3 Drawing Sheets

METHOD AND APPARATUS FOR IMAGE DATA TRANSFER IN DIGITAL PHOTOGRAPHING

TECHNICAL FIELD

The present application generally relates to image data transfer in digital photographing.

BACKGROUND

In digital photography, images are typically formed by passing light from an object through an objective onto an image sensor such as a CMOS or CCD unit. The image sensor typically comprises millions of pixel detectors for forming corresponding pixels of digital images.

In typical digital cameras, pixels or picture elements are formed by a camera module using pixel detectors sensitive to three different main colors (typically Red, Green and Blue). Images are then formed using the gained pixels. In the forming of the images, image quality is enhanced by various computational operations such as edge enhancement and pixel color interpolation. Image files are formed typically with image compression. Also some adjustments are typically made in white balance, focus and exposure by controlling the operation of the camera module. The processing is often distributed such that the camera module produces only elementary data that is passed over a fast camera module interface to another processor for heavier calculation.

SUMMARY

Various aspects of examples of the invention are set out in the claims.

The inventor realized that the development of image sensors is leading to new difficulties in the data transfer of image information from a camera unit to subsequent use in a camera device. In battery-operated mobile devices, power consumption is proportional to the clock frequencies used. The higher speeds, the higher power consumption. If image sensors develop radically over those presently used in camera phones e.g. to 40 megapixels and more, the data bus between a camera unit and its host device should be very fast and/or the image data should be compressed already in the camera unit.

According to a first example aspect of the present invention, there is provided an apparatus, comprising:

an input configured to receive image information from an image sensor relating to one image frame; and an image processing circuitry configured to produce one or more sub-images from the received image information according to given cropping data and to forward the produced one or more sub-images through an output.

The image sensor and the apparatus may be parts of a camera unit. The output may be a camera unit interface configured to exchange information between the camera unit and a circuitry external to the camera unit.

The image processing circuitry may be further configured to send image information only with the produced one or more sub-images.

The cropping data may further comprise exposure definition information. The image processing circuitry may be further configured to control the image sensor to produce image information with exposure time corresponding to the exposure definition.

The image processing circuitry may be further configured to define individual lines of pixels for image capture for the image sensor to direct the image sensor to provide the image information of only lines of pixels needed for the one or more sub-images.

The cropping data may contain spatial resolution information. The processing circuitry may be configured to determine the spatial resolution of the one or more sub-images using the spatial resolution information.

The image processing circuitry may be further configured to control the image sensor to produce image information with reduced spatial resolution by skipping analog-to-digital conversion of picture element detectors not needed for the one or more sub-images.

The image processing circuitry may be further configured to produce different sub-images with differing spatial resolutions.

The apparatus may be further comprise an image processor configured to combine two or more sub-images representative of a common image object and taken at different times and using different exposure times for forming one or more high-dynamic range images.

According to a second example aspect of the present invention, there is provided a method comprising:

receiving image information from an image sensor relating to one image frame; and producing one or more sub-images from the received image information according to given cropping data; and forwarding the produced one or more sub-images through an output.

According to a third example aspect of the present invention, there is provided a non-transitory memory medium comprising embodied therein a computer program comprising:

computer code for receiving image information from an image sensor relating to one image frame; and computer code for producing one or more sub-images from the received image information according to given cropping data; and computer code for forwarding the produced one or more sub-images through an output;

when executed by a computer.

According to a fourth example aspect of the present invention, there is provided an apparatus comprising:

input means for receiving image information from an image sensor relating to one image frame; and processing means for producing one or more sub-images from the received image information according to given cropping data and for forward the produced one or more sub-images through an output means for outputting information.

According to a fifth example aspect of the present invention, there is provided an apparatus comprising:

an input configured to receive pixel signals from an image sensor having a given image sensing area, the image sensor comprising pixel detectors;

an output configured to output image information for subsequent use; and an image processing circuitry configured to:
receive the pixel signals from the input;
produce, based on the pixel signals, a first digital image corresponding to a first region of the image sensing area;
produce, based on the pixel signals, a second digital image corresponding to a second region of the image sensing area;
cause outputting with the output the first digital images with a first resolution and first rate; and
cause outputting with the output the second digital images with a second resolution and second rate; wherein at least one of the first resolution and first rate is higher than respective second resolution and second rate.

Term resolution may refer to spatial resolution i.e. to the accuracy in which objects in images are reproduced.

The image processing circuitry may comprise at least one of a digital signal processor, a microprocessor, an application specific integrated circuit and an analog-to-digital converter.

The analog-to-digital converter may be configured to convert analog pixel signals into digital pixel signals only for regions belonging to a region from which a digital image is being produced.

The first digital images may be allocated more data transfer capacity than digital images corresponding to an image area outside the area corresponding to the first digital images.

The second region of the image sensor area may correspond to the portion of the image sensing that is usable for producing digital images. The second region may exclude the first region.

Bandwidth needed for data transfer may be further reduced by producing the second digital images such that the image sensing area used for producing the first digital images is excluded from the second digital images.

The image processing circuitry may be configured to maintain region information. The region information may contain cropping data that defines the first region. The image processing circuitry may be configured to receive update instructions and to correspondingly change the first region. The region information may further contain information defining the first rate. The region information may further contain information defining the first resolution.

The region information may further comprise cropping data defining the second region. The image processing circuitry may be configured to receive update instructions and to correspondingly change the second region. The region information may further contain information defining the second rate. The region information may further contain information defining the second resolution.

The image processing circuitry may be further configured to:
produce, based on the pixel signals, a third digital image corresponding to a third region of the image sensing area; and
cause outputting with the output the third digital images with a third resolution and third rate;
wherein at least one of the third resolution and third rate is higher than respective second resolution and second rate.

The region information may further comprise cropping data defining the third region. The image processing circuitry may be configured to receive update instructions and to correspondingly change the second region. The region information may further contain information defining the third rate. The region information may further contain information defining the third resolution.

The third region may overlap with the first region. Alternatively, the third region may be configured to exclude the first region at least when the first and third resolutions are similar.

The apparatus may be configured to produce still images.
The apparatus may be configured to produce video images.
The apparatus may be configured to concurrently produce video image of one or more image regions and one or more still images of one or more image regions.

According to a sixth example aspect of the present invention, there is provided an apparatus comprising:
an input configured to receive information from an image sensor relating to one image frame; and
an image processing circuitry configured to produce one or more sub-images from the received information according to given cropping data and to forward the produced one or more sub-images through an output.

The apparatus may be configured to send image information only with the produced one or more sub-images.

The output may be a camera unit interface configured to exchange information between a camera unit that comprises the apparatus and a circuitry external to the camera unit.

According to a seventh example aspect of the present invention, there is provided method comprising:
receiving pixel signals from an image sensor having a given image sensing area, the image sensor comprising pixel detectors;
producing, based on the pixel signals, a first digital image corresponding to a first region of the image sensing area;
producing, based on the pixel signals, a second digital image corresponding to a second region of the image sensing area;
outputting the first digital images with a first resolution and first rate; and
outputting the second digital images with a second resolution and second rate; wherein at least one of the first resolution and first rate is higher than respective second resolution and second rate.

According to an eighth example aspect of the present invention, there is provided a computer program comprising computer executable program code, configured to cause an apparatus, when executing the program code, to perform the method of the second or seventh example aspect.

The memory medium may be a non-transitory memory medium. The memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

Different non-binding example aspects and embodiments of the present invention have been illustrated in the foregoing. The above embodiments are used merely to explain selected aspects or steps that may be utilized in implementations of the present invention.

Some example embodiments of the invention may be presented only the detailed description of this document or in this summary, and/or only with reference to certain example aspects of the invention. It should be appreciated that embodiments relating to one example aspect or one embodiment may apply to other example aspects or embodiments as well.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 4 of the drawings.

Various examples will next be described to illustrate different example embodiments of the invention. The structures of these embodiments may be varied in many ways. It is intended to make reference to a schematic system presented in FIG. 1 in order to present a basic system in which example embodiments are described, and to then discuss various operations according to different example embodiments. This detailed description merely presents some example embodiments of the invention.

Figure 1:
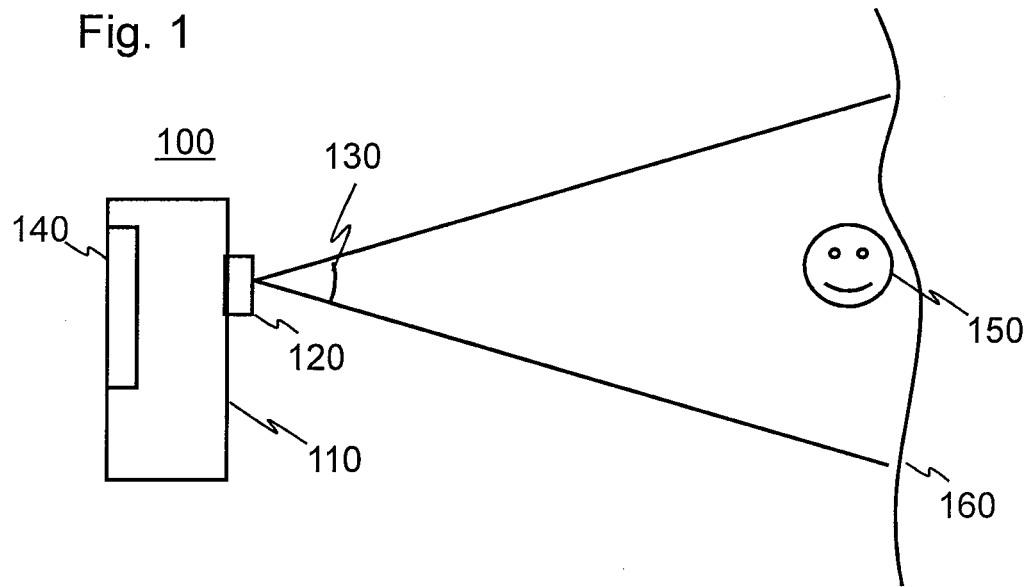
FIG. 1 shows a schematic system for use as a reference with which some example embodiments of the invention can be explained.

FIG. 1 shows a schematic system 100 for use as a reference with which some example embodiments of the invention can be explained. The system 100 comprises a device 110 such as a camera phone, gaming device, security camera device, personal digital assistant, tablet computer or a digital camera having a camera unit 120 with a field of view 130. The device 110 further comprises a display 140. FIG. 1 also shows an image object 150 that is being imaged by the camera unit 120 and a background 160 such as a curtain behind the image object.

In FIG. 1, the image object 150 is relatively small in comparison to the field of view at the image object 150. Next to the image object 150, there is a continuous background 160. While this setting is not by any means necessary, it serves to simplify FIG. 1 and description of some example embodiments of the invention.

Figure 2:
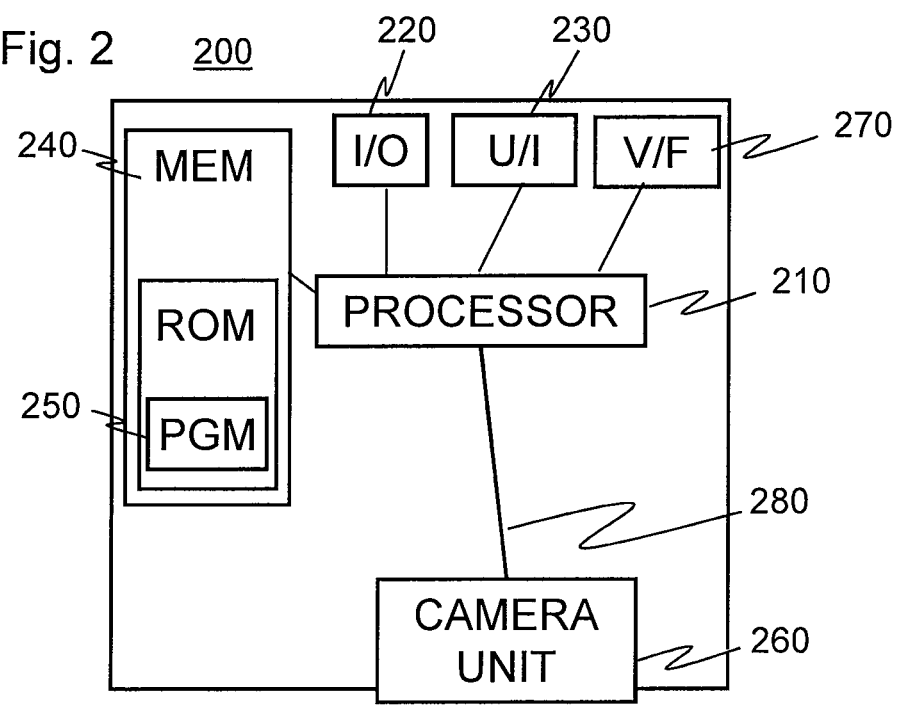
FIG. 2 shows a block diagram of an apparatus of an example embodiment of the invention.

FIG. 2 shows a block diagram of an apparatus 200 of an example embodiment of the invention. The apparatus 200 is suited for operating as the device 110. The apparatus 200 comprises a communication interface 220, a host processor 210 coupled to the communication interface module 220, and a memory 240 coupled to the host processor 210.

The memory 240 comprises a work memory and a non-volatile memory such as a read-only memory, flash memory, optical or magnetic memory. In the memory 240, typically at least initially in the non-volatile memory, there is stored software 250 operable to be loaded into and executed by the host processor 210. The software 250 may comprise one or more software modules and can be in the form of a computer program product that is software stored in a memory medium. The apparatus 200 further comprises a camera unit 260 and a viewfinder 270 each coupled to the host processor 210. The camera unit 260 and the processor 210 are connected via a camera interface 280.

Figure 3:
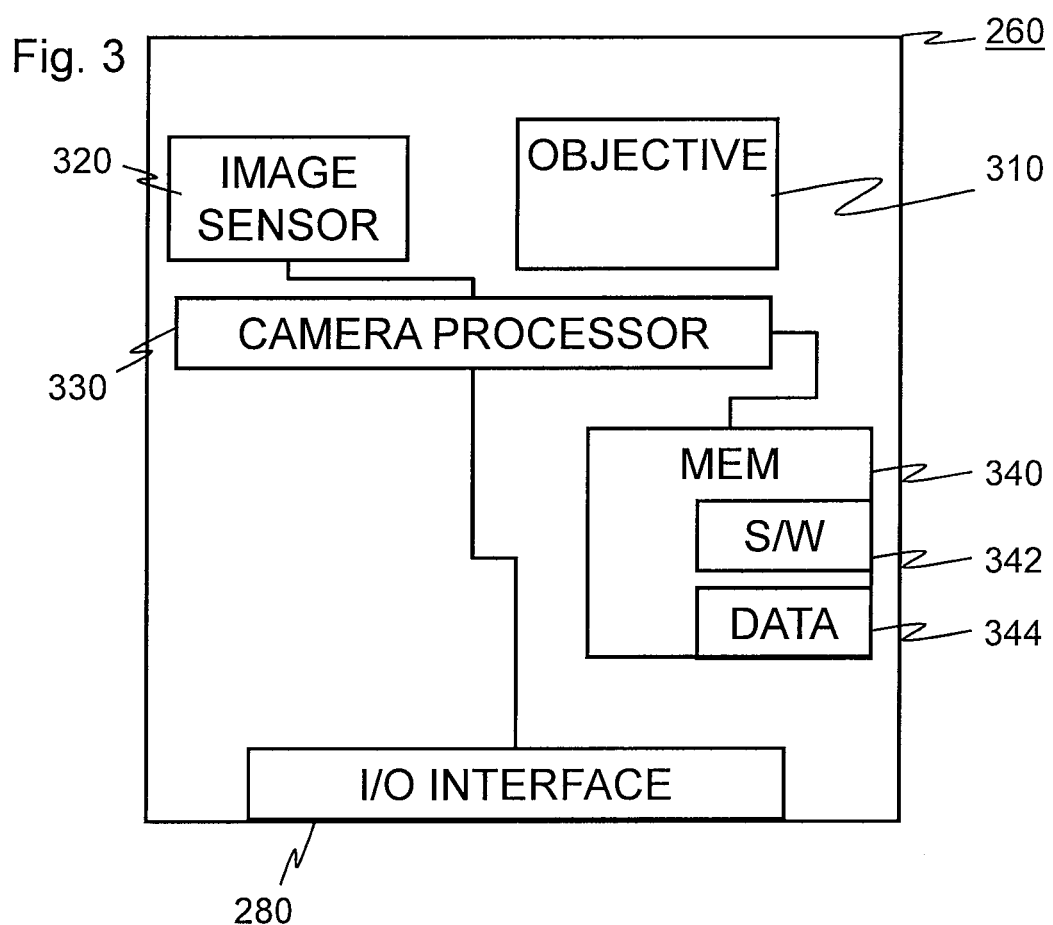
FIG. 3 shows a block diagram of a camera unit of an example embodiment of the invention.

Term host processor refers to a processor in the apparatus 200 in distinction of one or more processors in the camera unit 260, referred to as camera processor(s) 330 in FIG. 3. Depending on implementation, different example embodiments of the invention share processing of image information and control of the camera unit 260 differently between the camera unit and one or more processors outside the camera unit. Also, the processing is performed on the fly in one example embodiment and with buffering in another example embodiment. It is also possible that a given amount of images or image information can be processed on the fly and after than buffered operation mode is used as in one example embodiment.

It shall be understood that any coupling in this document refers to functional or operational coupling; there may be intervening components or circuitries in between coupled elements.

The communication interface module 220 is configured to provide local communications over one or more local links. The links may be wired and/or wireless links. The communication interface 220 may further or alternatively implement telecommunication links suited for establishing links with other users or for data transfer (e.g. using the Internet). Such telecommunication links may be links using any of: wireless local area network links, Bluetooth, ultra-wideband, cellular or satellite communication links. The communication interface 220 may be integrated into the apparatus 200 or into an adapter, card or the like that may be inserted into a suitable slot or port of the apparatus 200. While FIG. 2 shows one communication interface 220, the apparatus may comprise a plurality of communication interfaces 220.

The host processor 210 is, for instance, a central processing unit (CPU), a microprocessor, a digital signal processor (DSP), a graphics processing unit, an application specific integrated circuit (ASIC), a field programmable gate array, a microcontroller or a combination of such elements. FIG. 2 shows one host processor 210, but the apparatus 200 may comprise a plurality of host processors.

As mentioned in the foregoing, the memory 240 may comprise volatile and a non-volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. In some example embodiments, only volatile or non-volatile memory is present in the apparatus 200. Moreover, in some example embodiments, the apparatus comprises a plurality of memories. In some example embodiments, various elements are integrated. For instance, the memory 240 can be constructed as a part of the apparatus 200 or inserted into a slot, port, or the like. Further still, the memory 240 may serve the sole purpose of storing data, or it may be constructed as a part of an apparatus serving other purposes, such as processing data. Similar options are thinkable also for various other elements.

A skilled person appreciates that in addition to the elements shown in FIG. 2, the apparatus 200 may comprise other elements, such as microphones, displays, as well as additional circuitry such as further input/output (I/O) circuitries, memory chips, application-specific integrated circuits (ASIC), processing circuitry for specific purposes such as source coding/decoding circuitry, channel coding/decoding circuitry, ciphering/deciphering circuitry, and the like. Additionally, the apparatus 200 may comprise a disposable or rechargeable battery (not shown) for powering the apparatus when external power if external power supply is not available.

It is also useful to realize that the term apparatus is used in this document with varying scope. In some of the broader claims and examples, the apparatus may refer to only a subset of the features presented in FIG. 2 or even be implemented without any one of the features of FIG. 2. In one example embodiment term apparatus refers to the processor 210, an input of the processor 210 configured to receive information from the camera unit and an output of the processor 210 configured to provide information to the viewfinder. In one example embodiment, the apparatus refers to a device that receives image information from the image sensor via a first input and produces sub-images to a second input of an image processor, which image processor is any circuitry that makes use of the produced sub-images. For instance, the image processor may comprise the processor 210 and the device in question may comprise the camera processor 330 and the camera interface 280 shown in FIG. 3.

FIG. 3 shows a block diagram of a camera unit 260 of an example embodiment of the invention. The camera unit 260 comprises an objective 310, an image sensor 320, a camera processor 330, a memory 340 comprising data 344 and software 342 with which the camera processor 330 can manage operations of the camera unit 260. The camera processor 330 operates as an image processing circuitry of an example embodiment. An input/output or camera interface 280 is also provided to enable exchange of information between the camera unit 260 and the host processor 210. The image sensor 320 is, for instance, a CCD or CMOS unit. In case of a CMOS unit, the image sensor 320 can also contain built-in analog-to-digital implemented on common silicon chip with the image sensor 320. In an alternative example embodiment, a separate A/D conversion is provided between the image sensor 320 and the camera processor 330.

The camera processor 330 takes care in particular example embodiments of one or more of the following functions:
  Pixel color interpolation;
  White balance correction;
  Edge enhancement;
  Aspect ratio control by selecting pixel detectors to be used in producing sub-images;
  Aspect ratio control by cropping or stretching taken sub-images;
  Anti-aliasing of images;
  Vignetting correction;
  Combining of subsequent images for high dynamic range imaging; and
  Bayer reconstruction filtering;
  Chromatic aberration correction;
  Dust effect compensation;
  Downscaling of second image region or foreground image e.g. for viewfinder use;
  Defining individual pixel detectors for image capture for focused reading of only those pixels that are needed for desired first regions; and
  Defining individual lines of pixels for image capture for focused reading of only lines of pixels needed for desired first regions.

The data 344 comprises, for example, cropping data that defines corners of each first image region or sub-image that is desired to be captured. The cropping data is received, according to an example embodiment, through the interface 280 from the host processor 210.

It is understood that there are various different implementations according to different example embodiments for the apparatus 200 as well as for the camera module 260. For instance, the apparatus 200 can be provided with an image accelerator configured to process information received from the interface 280 that otherwise would be performed by the host processor 210 or by the camera processor 330. Moreover, either or both of the host processor 210 and of the camera processor 330 can be implemented using one or more processors.

Figure 4:
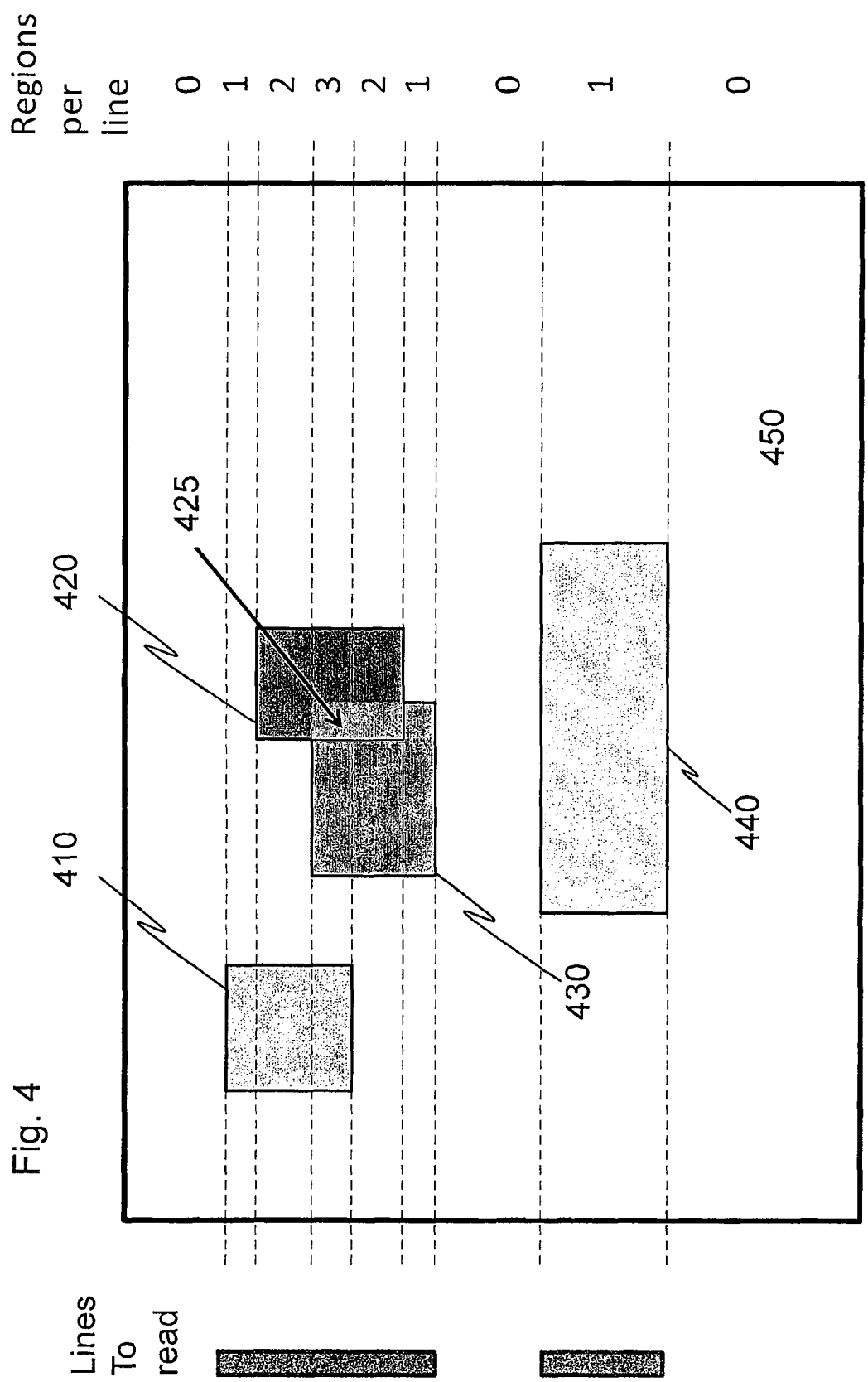
FIG. 4 shows an example of concurrent four imaging regions.

FIG. 4 shows an example of concurrent four first imaging regions, i.e. first to fourth primary imaging regions 410 to 440, respectively, for image capture by the image sensor. Three of the first imaging regions are aligned along common lines of pixels or image segments. The second and third imaging regions 420, 430 have an overlapping region 425. As shown by numbers on the right-hand side of each line of pixels, there are lines with 0 to 3 different regions. FIG. 4 also shows a second imaging region 450 that is the background or remainder of the image area of the image sensor 464. While FIG. 4 shows four first imaging regions, there are example embodiments which support only one, two, three or more than four first imaging regions.

In an example embodiment, different imaging regions may differ such that some imaging regions can be recorded as still images some other imaging regions can be recorded as video images or still images of different spatial resolution. In video imaging, according to one example embodiment, the spatial resolution is adjusted to produce video images of desired size in horizontal and vertical pixels. In still imaging, the spatial resolution is also adjusted in one example embodiment to produce images of desired image size. The adjustment of the spatial resolution can be performed by downscaling or upscaling imaging regions using any of the known techniques such as skipping pixels, averaging pixels, interpolating pixels, replicating pixels and edge enhancing.

In one example embodiment, the processing of the pixel signals is directed to only lines of pixel detectors with image regions to be captured during one imaging period. The term imaging period refers here to the exposure time of the imaging sensor. The imaging period may be also shorter than normal exposure period. The images can be formed by combining subsequent images for acquiring the desired imaging regions.

In one example embodiment, the entire image is always digitized i.e. analog-to-digital converted. In another example embodiment, the entire image is first digitized with reduced spatial resolution: for instance, only each second or third line of pixels is converted to digital form. For producing of a second imaging region, the entire image is down-sampled in one example embodiment. In one example embodiment, some pixels are skipped along lines of pixels on producing the entire image. In this way, a coarse image is obtained e.g. for display on a viewfinder when the user is not taking a photograph of any region of interest. Also, it is possible to use an image sensor with too many pixels for the speed of analog-to-digital conversion and/or for the speed of data transfer over the camera interface 280, when only selected pixel detectors are actually read.

In one example embodiment, when the data transfer speed suffices, one or more of the imaging regions are captured at the maximum data rate enabled by the exposure time and the speed of the image sensor and the resulting images are transferred over the camera interface 280. For example, let us assume a 50 Mpixel image sensor and the imaging regions using only 20% of the image sensors total pixel detectors. Assuming that the camera interface 280 is capable of transferring 20 Mpixels at a rate of 5 times a second, the same camera interface 280 can be used to transfer the imaging regions of interest 10 times a second. Or, all the pixels produced by the image sensor could only be transferred at a rate of 2 times per second.

In an example embodiment, an entire image is obtained from the image sensor 320 and transferred over the camera interface 280 during a first period of time with a first duration. Cropped images are transferred at a second period of time with a second period of time. The second period of time is shorter than the first period of time. In this way, an image can be obtained of the entire image area of the image sensor 320 relatively slowly and cropped smaller images can be obtained faster.

In an example embodiment, two or more cropped images are obtained from the image sensor 320 and transferred over the camera interface 280 for high dynamic range imaging. For instance, the host processor 210 can request in rapid succession short-exposure cropped images and combine together for high dynamic range imaging. Some of the successive cropped images can be defined for different image area e.g. to better image darker areas in a combined image.

Embodiments of the present invention may be implemented in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 4. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The invention claimed is:

1. An apparatus, comprising:
an input configured to receive from an image sensor image information relating to one image frame;
an image processing circuitry configured to produce a plurality of sub-images from the received image information according to given cropping data and to forward the plurality of sub-images through an output, wherein the plurality of sub-images comprise a first set of sub-images,
wherein the image sensor and the apparatus are parts of a camera unit and the output is a camera unit interface configured to exchange information between the camera unit and a circuitry external to the camera unit, and
wherein the image processing circuitry is further configured to send image information over the camera unit interface only as the plurality of sub-images; and
an image processor configured to combine two or more sub-images for forming one or more high-dynamic range images, wherein the two or more sub-images comprise a second set of sub-images, and wherein each of the sub-images of the second set is of a different image frame and is representative of a common image object and is taken at different times using different exposure times.

2. The apparatus of claim 1, wherein the cropping data further comprises exposure definition information and the image processing circuitry is further configured to control the image sensor to produce image information with exposure time corresponding to the exposure definition.

3. The apparatus of claim 1, wherein the image processing circuitry is further configured to define individual lines of pixels for image capture for the image sensor to direct the image sensor to provide the image information of only the lines of pixels needed for the plurality of sub-images.

4. The apparatus of claim 1, wherein the cropping data contains spatial resolution information and the image processing circuitry is configured to determine the spatial resolution of the plurality of sub-images using the spatial resolution information.

5. The apparatus of claim 4, wherein the image processing circuitry is further configured to control the image sensor to produce image information with reduced spatial resolution by skipping analog-to-digital conversion of picture element detectors not needed for the plurality of sub-images.

6. The apparatus of claim 1, wherein the image processing circuitry is configured to produce different sub-images with different spatial resolutions on the producing of the plurality of sub-images.

7. The apparatus of claim 1, wherein the apparatus is a battery-operated mobile device.

8. The apparatus of claim 1, wherein the image processing circuitry is further configured to obtain from the image sensor, relating to another image frame, an entire image so that some pixels are skipped along lines of pixels when a user is not taking a photograph of any region of interest and to send the entire image over the camera unit interface.

9. A method comprising:
in a camera unit:
receiving from an image sensor image information relating to one image frame;
producing a plurality of sub-images from the received image information according to given cropping data, wherein the plurality of sub-images comprise a first set of sub-images;
forwarding the plurality of sub-images through an output that is a camera unit interface between the camera unit and a circuitry external to the camera unit,
wherein image information is sent over the camera unit interface only as the plurality of sub-images; and
an image processor configured to combine two or more sub-images for forming one or more high-dynamic range images, wherein the two or more sub-images comprise a second set of sub-images, and wherein each of the sub-images of the second set is of a different image frame and is representative of a common image object and is taken at different times using different exposure times.

10. The method of claim 9, wherein the cropping data further comprises exposure definition information and the method further comprises controlling the image sensor to produce image information with exposure time corresponding to the exposure definition.

11. The method of claim 9, further comprising defining individual lines of pixels for image capture for the image sensor to direct the image sensor to provide the image information of only lines of pixels needed for the plurality of sub-images.

12. The method of claim 9, wherein the cropping data contains spatial resolution information and the method further comprises determining the spatial resolution of the plurality of sub-images using the spatial resolution information.

13. The method of claim 12, further comprising controlling the image sensor to produce image information with reduced spatial resolution by skipping analog-to-digital conversion of picture element detectors not needed for the plurality of sub-images.

14. The method of claim 9, wherein the producing of the plurality of sub-images comprises producing different sub-images with differing spatial resolutions.

15. The method claim 9, further comprising:
obtaining from the image sensor, relating to another image frame, an entire image so that some pixels are skipped along lines of pixels when a user is not taking a photograph of any region of interest; and sending the entire image over the camera unit interface.

16. A computer program product comprising a non-transitory memory medium having computer readable program code embodied therein, which when executed by a computer processor causes an apparatus to perform:

receiving from an image sensor of a camera unit image information relating to one image frame;

producing a plurality of sub-images from the received image information according to given cropping data, wherein the plurality of sub-images comprise a first set of sub-images;

forwarding the produced plurality of sub-images through an output that is a camera unit interface between the camera unit and a circuitry external to the camera unit, wherein image information is sent over the camera unit interface only as the plurality of sub-images; and an image processor configured to combine two or more sub-images for forming one or more high-dynamic range images, wherein the two or more sub-images comprise a second set of sub-images, and wherein each of the sub-images of the second set is of a different image frame and is representative of a common image object and is taken at different times using different exposure times.

17. The computer program product of claim 16, wherein the computer readable program code, when executed by the computer processor, further causes the apparatus to perform:

obtaining from the image sensor, relating to another image frame, an entire image so that some pixels are skipped along lines of pixels when the user is not taking a photograph of any region of interest; and sending the entire image over the camera unit interface.

18. An apparatus comprising:

input means for receiving from an image sensor image information relating to one image frame;

processing means for producing a plurality of sub-images from the received image information according to given cropping data and for forwarding the produced plurality of sub-images through an output means for outputting information, wherein the plurality of sub-images comprise a first set of sub-images, wherein the image sensor and the apparatus are parts of a camera unit and the output means is a camera unit interface means configured to exchange information between the camera unit and a circuitry external to the camera unit, and wherein image information is sent over the camera interface only as the plurality of sub-images; and processing means for combining two or more sub-images for forming one or more high-dynamic range images, wherein the two or more sub-images comprise a second set of sub-images, and wherein each of the sub-images of the second set is of a different image frame and is representative of a common image object and is taken at different times using different exposure times.

* * * * *